US012592776B2

(12) United States Patent
Bovington et al.

(10) Patent No.: US 12,592,776 B2
(45) Date of Patent: Mar. 31, 2026

(54) USER-SELECTABLE OPTICAL INTERFACE

(71) Applicant: Cisco Technology, Inc., San Jose, CA (US)

(72) Inventors: Jock T. Bovington, Koenigstein im Taunus (DE); Mark C. Nowell, Ottawa (CA); Thomas J. Williams, Sudbury, MA (US); Matthew J. Traverso, Saratoga, CA (US); Gary Nicholl, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 18/189,114

(22) Filed: Mar. 23, 2023

(65) Prior Publication Data

US 2024/0322909 A1     Sep. 26, 2024

(51) Int. Cl.
| | |
|---|---|
| *H04B 10/50* | (2013.01) |
| *H04B 10/112* | (2013.01) |
| *H04B 10/40* | (2013.01) |
| *H04B 10/60* | (2013.01) |

(52) U.S. Cl.
CPC ....... *H04B 10/503* (2013.01); *H04B 10/1127* (2013.01); *H04B 10/40* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 5,583,683 | A * | 12/1996 | Scobey .............. | G02B 6/29367 398/79 |
| 5,692,080 | A * | 11/1997 | Lu ........................ | G02B 6/3893 385/60 |
| 6,041,152 | A * | 3/2000 | Clark .................. | H04J 14/0307 398/1 |
| 11,336,376 | B1 * | 5/2022 | Xie ...................... | H04B 10/572 |

(Continued)

OTHER PUBLICATIONS

Cyriel Minkenberg et al., Co-packaged datacenter optics: Opportunities and challenges, IET: The Institution of Engineering and Technology, Dated: Sep. 16, 2020, pp. 1-15.

*Primary Examiner* — Darren E Wolf
(74) *Attorney, Agent, or Firm* — Patterson + Sheridan, LLP

(57) ABSTRACT

The systems and devices described provide for a user selectable CPO interface for both duplex and parallel optical network interfaces. The systems include a pluggable optical device with a laser source subassembly, an internal optical connector, a plurality of laser source optical paths connecting the laser source subassembly to the internal optical connector, and an external optical connector. The system also includes a plurality of transmit optical paths connecting the internal optical connector and the external optical connector and a plurality of receive paths connecting the internal optical connector and the external optical connector. The systems also include photonic device with a a set of laser source input channels connected to the pluggable optical device via a shared fiber array unit (FAU), a set of optical input channels receiving input optical signals from the pluggable optical device via the shared FAU, and a set of optical output channels transmitting optical signals from the photonic device to the pluggable optical device via the shared FAU.

11 Claims, 7 Drawing Sheets

(56)         References Cited

U.S. PATENT DOCUMENTS

| | | | |
|---|---|---|---|
| 11,614,578 B2 | 3/2023 | Bovington et al. | |
| 2004/0028406 A1* | 2/2004 | Bortz ................. | H04Q 11/0005 |
| | | | 398/49 |
| 2005/0041933 A1* | 2/2005 | Meadowcroft ...... | G02B 6/4292 |
| | | | 385/92 |
| 2008/0212966 A1* | 9/2008 | Costantini ........... | H04J 14/0307 |
| | | | 398/79 |
| 2009/0110391 A1* | 4/2009 | Matityahu ............ | H04B 10/075 |
| | | | 398/25 |
| 2010/0239257 A1* | 9/2010 | Grossman ........... | H04J 14/0282 |
| | | | 398/68 |
| 2014/0248057 A1* | 9/2014 | Li ........................ | G02B 6/2938 |
| | | | 398/79 |
| 2014/0334789 A1* | 11/2014 | Matsuo ................ | G02B 6/0365 |
| | | | 385/126 |
| 2021/0044356 A1* | 2/2021 | Aboagye .............. | H04B 10/503 |
| 2021/0132293 A1* | 5/2021 | Feng ...................... | G02B 6/245 |
| 2021/0176542 A1 | 6/2021 | Frankel et al. | |
| 2022/0187559 A1 | 6/2022 | Lin et al. | |

* cited by examiner

USER-SELECTABLE OPTICAL INTERFACE

TECHNICAL FIELD

Embodiments presented in this disclosure generally relate to co-packaged optics (CPO) applications, and more specifically, to photonic devices, pluggable optical modules, and external laser sources (ELS) for CPO applications.

BACKGROUND

Co-packaged optics (CPO) or near-packaged optics (NPO) applications present a potential for lower power and lower cost implementations of optical communication devices and network. However, tighter integration of the optics provided by CPO application also creates some operational challenges. In traditional CPO applications, users tend to have reduced flexibility for optical interfaces after the installation of optical network equipment due to a reduced number of pluggable modules in CPO applications. Additionally, lasers or other light sources, commonly used with CPO applications, may also present thermal challenges when co-located with other optical hardware. Further, the lasers can pose a reliability risk, which tends to compound within increasing numbers of lasers. Providing interchangeable optical interfaces for CPO applications remains a challenge.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
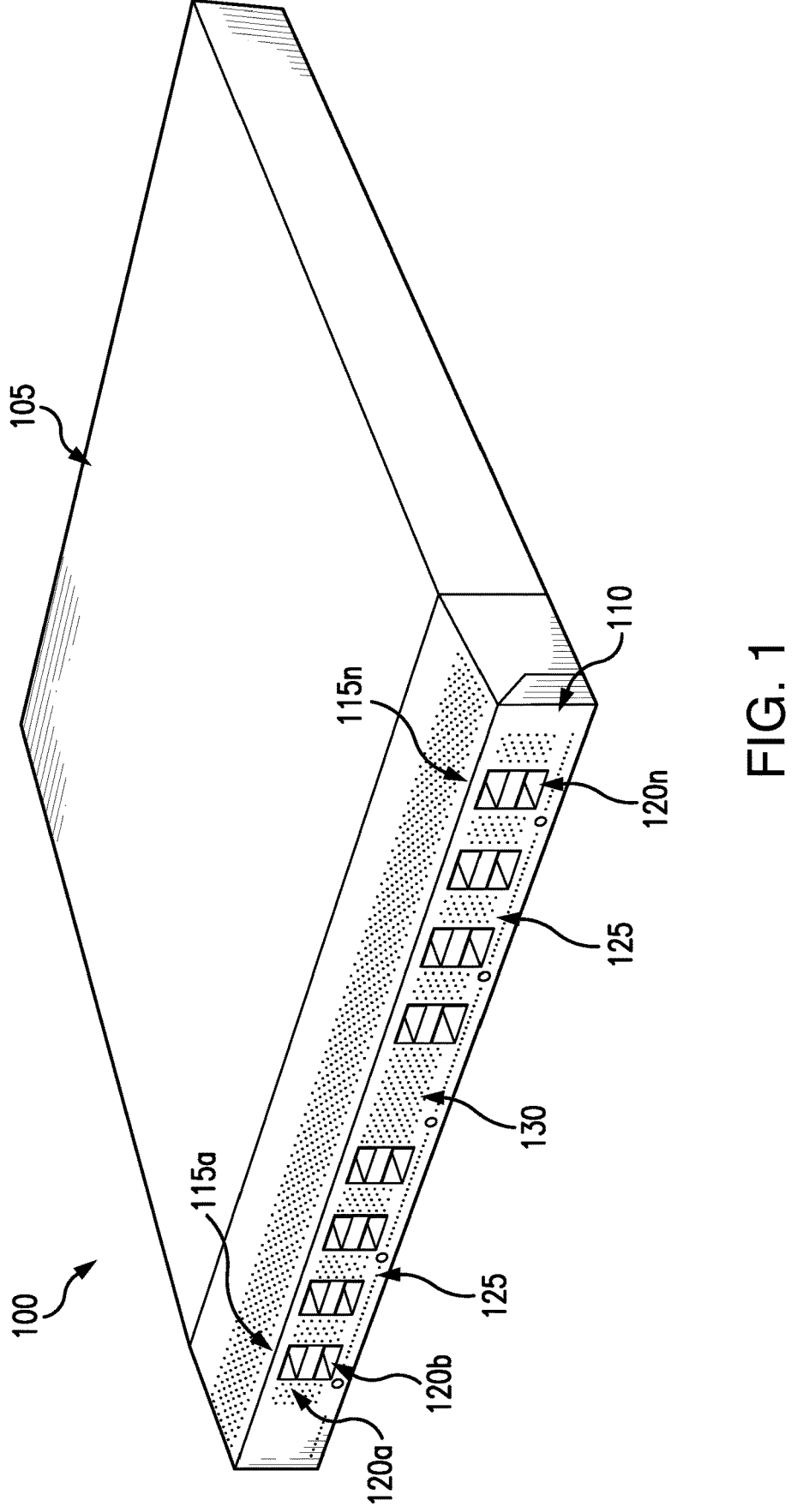
FIG. 1 is a network device supporting multiple pluggable optical modules, according to one or more embodiments.

One general aspect includes a photonic device. The photonic device includes a set of laser source input channels connected via a shared fiber array unit (FAU) to an external laser source (ELS) located on a pluggable optical device, a set of optical input channels receiving input optical signals from the pluggable optical device via the shared FAU, and a set of optical output channels transmitting optical signals from the photonic device to the ELS via the shared FAU.

One general aspect includes a pluggable optical device. The pluggable optical device includes a laser source subassembly; an internal optical connector, a plurality of laser source optical paths connecting the laser source subassembly to the internal optical connector, an external optical connector, a plurality of transmit optical paths connecting the internal optical connector and the external optical connector, and a plurality of receive paths connecting the internal optical connector and the external optical connector.

One general aspect includes an optical system. The system includes a pluggable optical device including: a laser source subassembly, an internal optical connector, a plurality of laser source optical paths connecting the laser source subassembly to the internal optical connector, an external optical connector, a plurality of transmit optical paths connecting the internal optical connector and the external optical connector, and a plurality of receive paths connecting the internal optical connector and the external optical connector. The system also includes a photonic device including: a set of laser source input channels connected to the pluggable optical device via a shared fiber array unit (FAU), a set of optical input channels receiving input optical signals from the pluggable optical device via the shared FAU, and a set of optical output channels transmitting optical signals from the photonic device to the pluggable optical device via the shared FAU.

EXAMPLE EMBODIMENTS

As described above, CPO applications increase the performance (e.g., speed, reliability, throughput, etc.) of an optical communication network, but also present user configurability and customization challenges. For example, CPO optical interfaces, such as a CPO tile or CPO optical engine, may be packaged with an application specific integrated circuit (ASIC) or other electronic, photonic, or optoelectronic devices. The CPO tile may provide operations and mechanisms to transmit and receive optical signals via optical connections and to serve as the signal interface between the ASIC and the optical connections. While the close proximity of the CPO tile to the ASIC improves the overall performance of the network, current CPO tiles are configured for specific optical interfaces. For example, a first CPO tile may be configured to support a parallel fiber interface and a second CPO tile may be configured to support a duplex fiber interface, among other interface variations.

While manufacturers and users may be able to adapt specific components according to a given design, once a CPO tile is packaged onto a platform, the user is limited in the type of interface that may be connected to the CPO tile. For example, the user is only able to connect a parallel fiber interface to CPO tile configured for parallel interfaces. This leads to manufacturing complications since each optics platform and network device will need to be individually designed according to the intended end use of the individual CPO tiles. Additionally, the limited configurability of the CPO tiles limits the future use and interoperability of the network device. For example, a user may want to swap out or upgrade the connected fiber interface, but is limited by the CPO tile interface.

The systems and devices described herein provide for a user selectable CPO interface for both duplex and parallel optical network interfaces.

FIG. 1 is a network device supporting multiple pluggable optical modules, according to one or more embodiments. The network device 100 may be a CPO device providing any suitable networking functionality, such as switching, routing, etc., in a network. The network may include any type of optical communication network including a datacenter network, a wide area network, or other optical based network.

The network device 100 includes a housing 105 within which components of the network device 100 are housed. The housing 105 may be formed of any suitable material(s) and may have any suitable dimensioning. For example, the housing 105 may have a standardized dimensioning such that the network device 100 is rack-mountable in a standard rack, such as racks used in data-center or other large-scale computing/networking applications.

In some embodiments, the housing 105 includes a system PCB (or host PCB) that includes electronic components and optical components, and that couples with pluggable optical devices that are plugged into openings 120a-120n, which are defined by a faceplate 110 of the housing 105. The openings 120a-120n may be arranged as respective pairs 115a-115n in a "stacked" configuration (as shown, a vertical arrangement of the respective openings 120a and 120b). In this way, the network device 100 may support a stacked configuration of pluggable optical devices with each respective pair 115a-115n.

In some examples, the faceplate 110 also include multiple air intakes 125 and 130 that support air flow through the housing 105 to remove heat from the various components of the network device 100. The network device 100 may also include one or more fans (not shown in FIG. 1) that draw air into the housing 105 through the air intakes 125 and 130. The air intakes 125 and 130 may have any suitable dimensioning and arrangement to provide cooling airflow through the housing 105. For example, the air intake 125 has a first sizing, and the air intake 130 has a second sizing greater than the first sizing of the air intake 125. As shown, the air intake 130 has a central position on the faceplate 110 while the air intakes 125 are between adjacent pairs 115a-115n away from the central position.

In some examples, the network device 100 provides the user with multiple configurability options. For example, pluggable optical modules may be connected to the network device via the openings 120a-120n, where the user is able to select from many types of pluggable optical modules, including pluggable optical modules of different fiber interfaces. In order to provide user configurability and ease of use, the network device includes photonic devices that offer interface operability based on the user installed pluggable optical devices, as shown in more detail in relation to FIGS. 2A-2B.

Figures 2A, 2B:
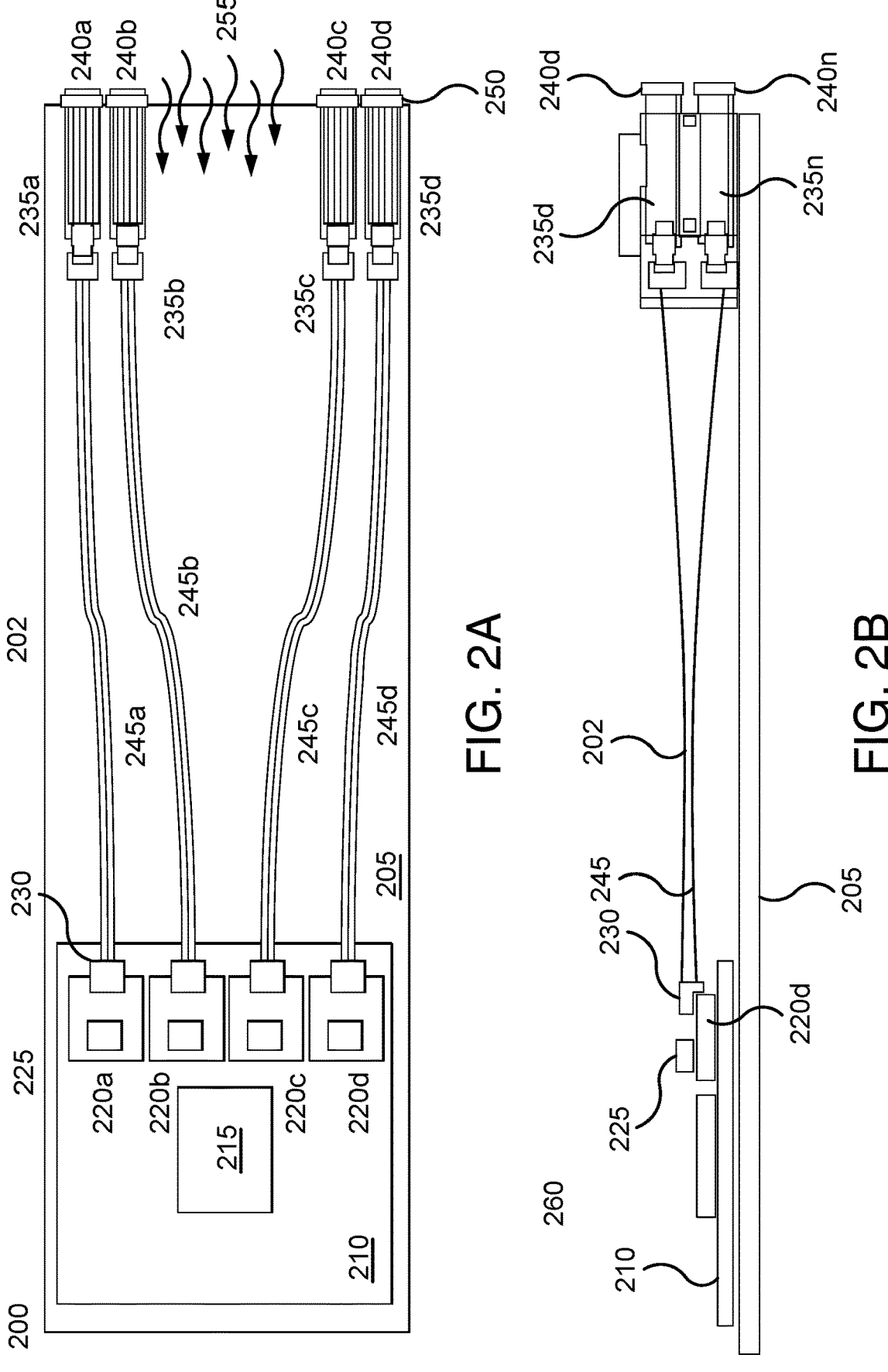
FIGS. 2A and 2B provide views of a network device with multiple pluggable optical modules, according to one or more embodiments.

FIGS. 2A and 2B provide views of a network device 202 with multiple pluggable optical modules 240a-240-n, according to one or more embodiments. More specifically, diagram 200 of FIG. 2A provides a top view of the network device 202 (showing pluggable optical modules 240a-240d), and diagram 260 of FIG. 2B provides a side view of the network device 202 (showing pluggable optical modules 240d and 240n). The features illustrated in diagrams 200 and 260 may be used in conjunction with other embodiments described herein. For example, the network device 202 represents one possible implementation of the host devices illustrated in FIG. 1.

In the diagrams 200 and 260, the network device 202 includes a host PCB 205, and a substrate 210 arranged on the host PCB 205. In some examples, the substrate 210 includes a silicon substrate, although other implementations of the substrate 210 are also contemplated. An application-specific integrated circuit (ASIC) 215 (e.g., a host processor) and a plurality of photonic devices 220a-220d (collectively photonic device 220) are arranged on the substrate 210. A respective electronic die 225 is arranged on each photonic device 220a-220d. Each of the ASIC 215, the plurality of photonic devices 220a-220d, and the electronic dies 225 may provide any suitable functionality for processing electrical signals and/or optical signals.

Figure 5:
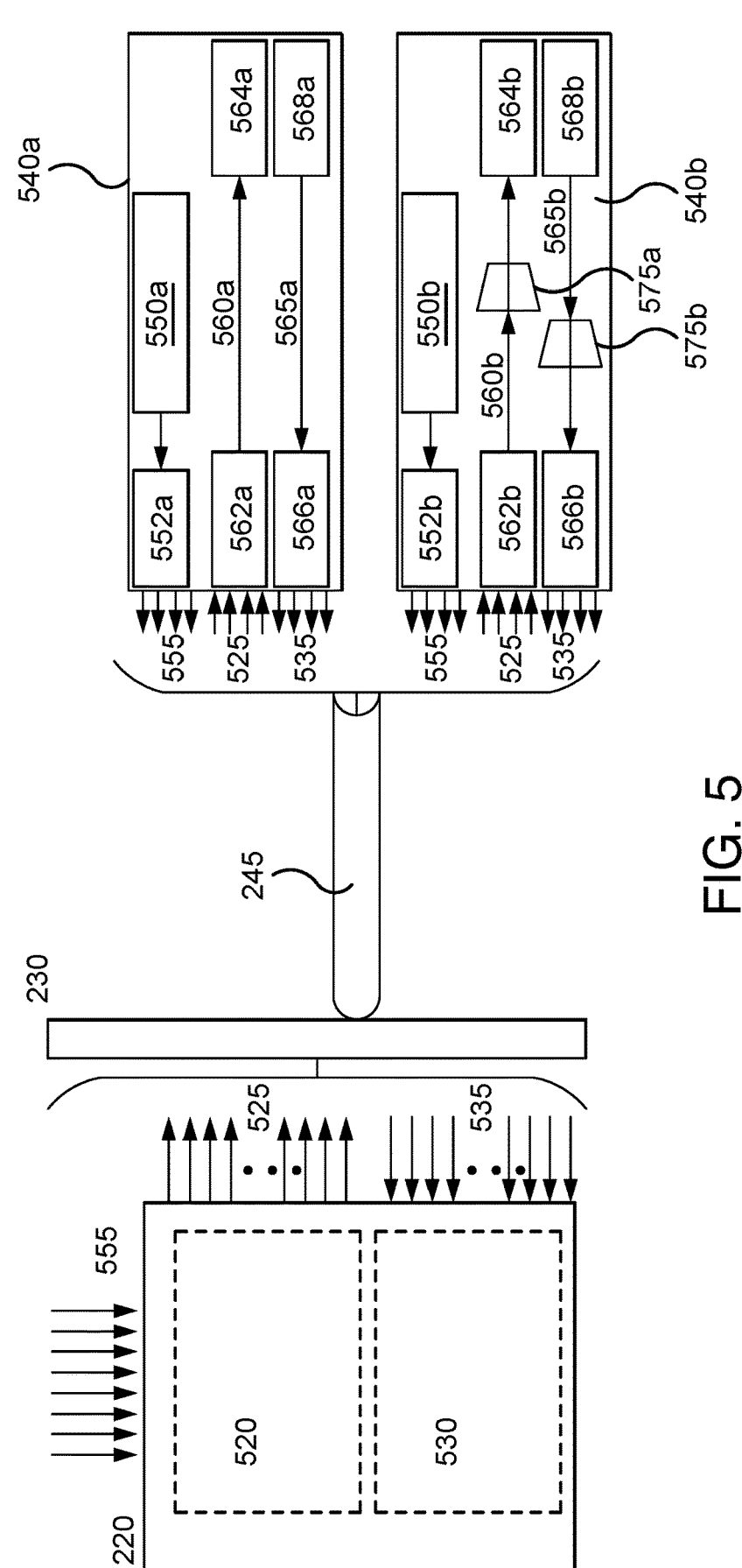
FIGS. 5 and 6 provides views of a photonic device connected to a pluggable optical module, according to one or more embodiments.
Figure 6:
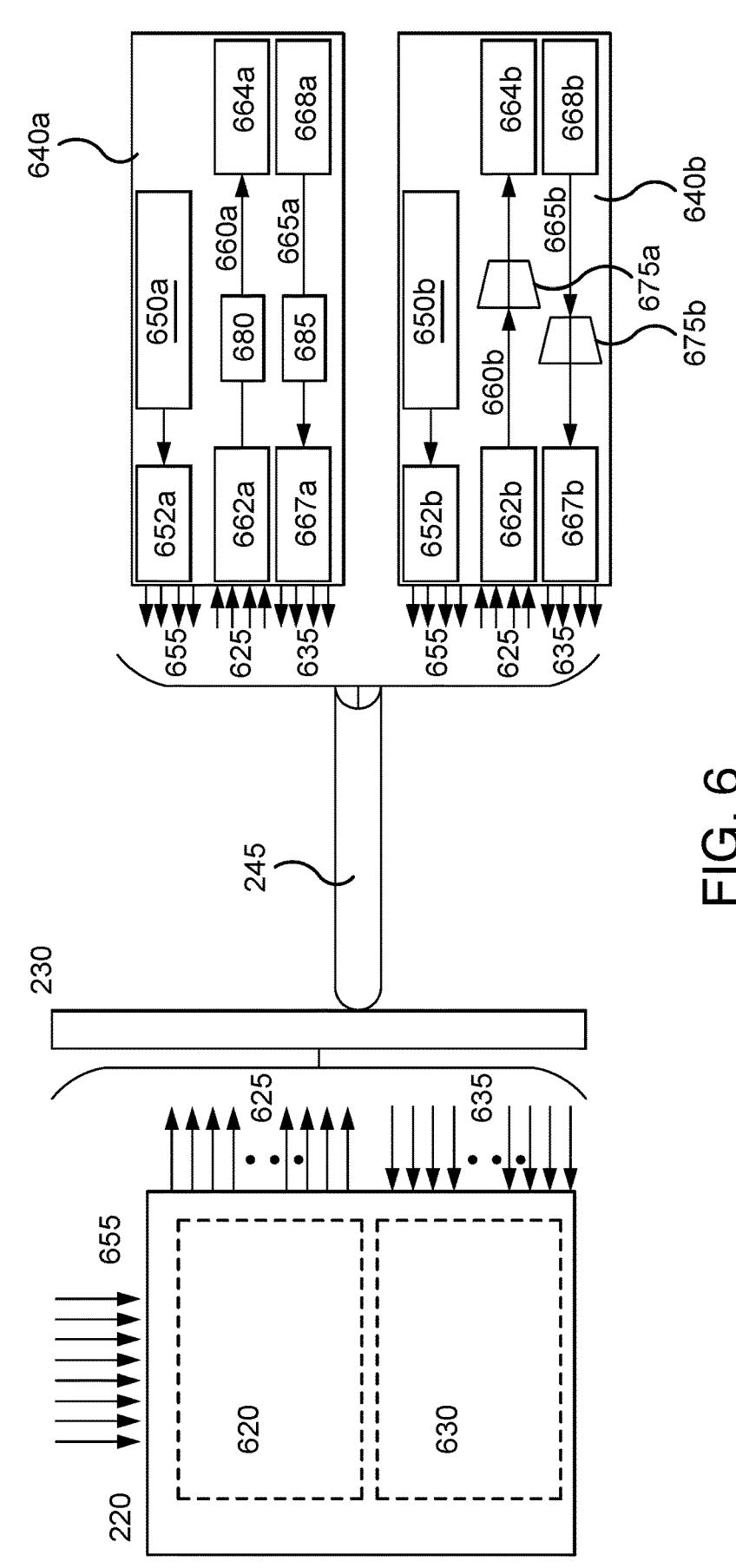

For example, the photonic devices 220a-220d may each include a set of laser source input channels, a set of laser source input channels, and a set of optical output channels as described in more detail in relation to FIGS. 5 and 6. Additionally, each of the photonic devices includes a shared fiber array unit. For example, a respective shared fiber array unit (FAU) 230 is arranged on each photonic die 220a-220d. The shared FAUs 230 attach to respective optical fibers 245a-245d (collectively optical fibers 245) and position the optical fibers 245a-245d to optically couple with optical waveguides or other optical components formed in the respective photonic dies 220a-220d. Each of the optical fibers 245a-245d may represent a respective one or more optical fibers, which may be polarization maintaining fibers (PMFs), single mode optical fibers (SMFs) and/or multicore optical fibers (MCFs), as described in more detail in relation to FIGS. 5 and 6.

Figure 3:
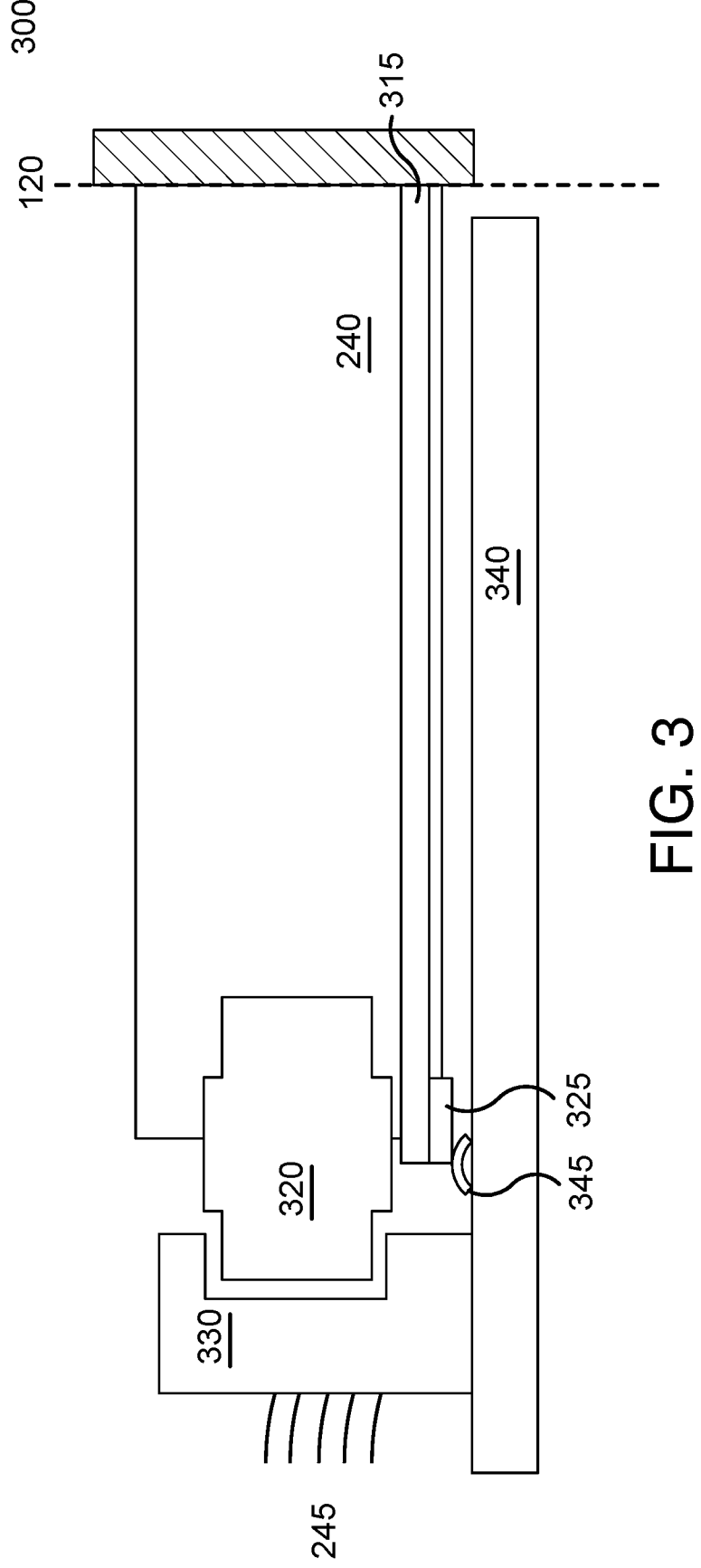
FIG. 3 illustrates coupling a pluggable optical module with a network device, according to one or more embodiments.
Figure 4:
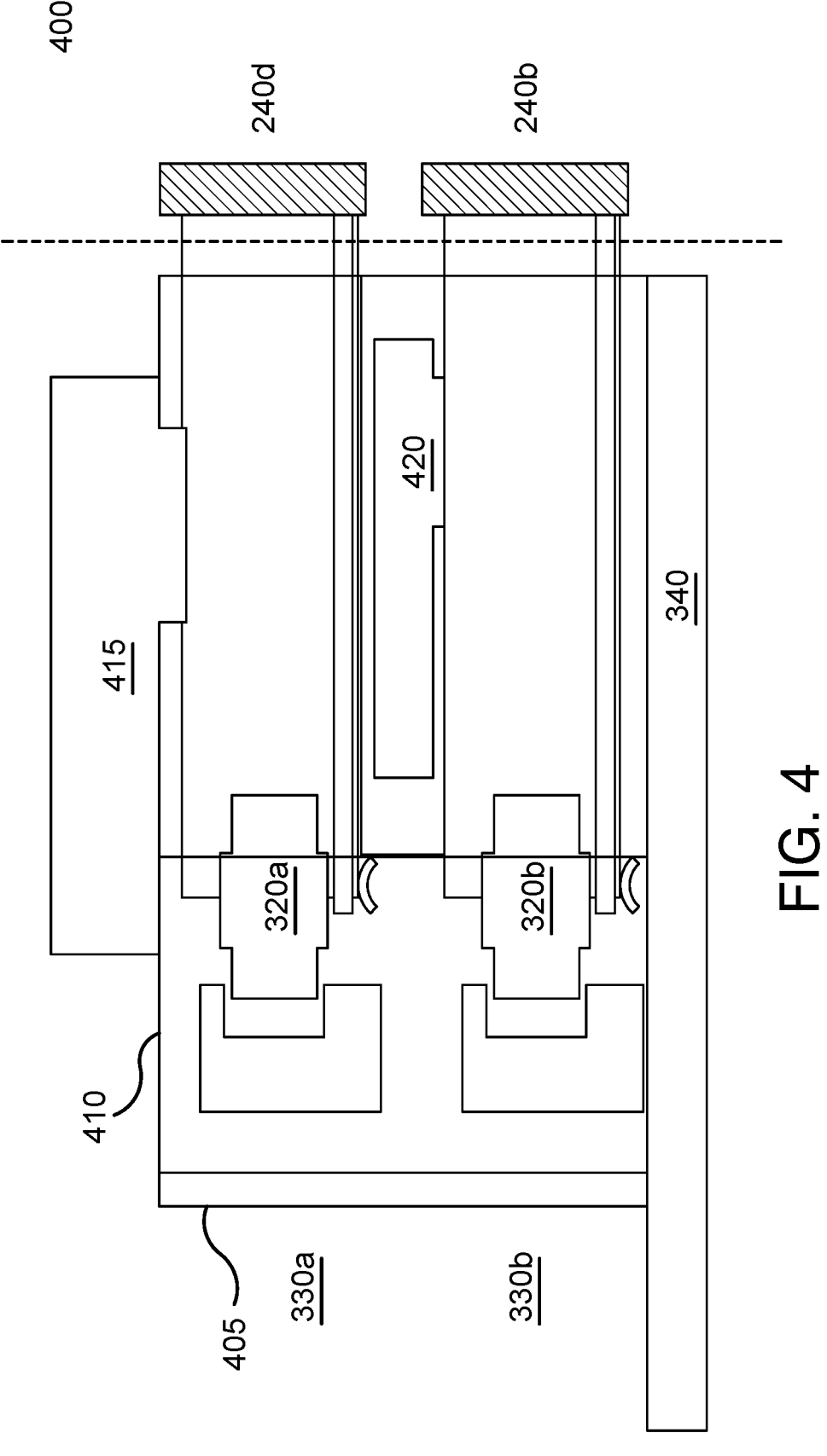
FIG. 4 illustrates coupling two pluggable optical modules in a stacked configuration with a network device, according to one or more embodiments.

The network device 202 further includes a plurality of receptacles 235a-235n that are each configured to receive a respective pluggable optical module 240a-240n. In some examples, each of the receptacles 235a-235n may be configured as shown in FIGS. 3 and 4 described herein. Each of the optical fibers 245a-245d may extend from the shared FAUs 230 to a respective receptacle 235a-235d, such that the pluggable optical modules 240a-240n are optically coupled with the photonic dies 220a-220d.

The pluggable optical modules 240a-240n may provide any suitable functionality, as described herein. In some examples, each of the pluggable optical modules 240a-240n includes one or more external optical connectors that are arranged at the faceplate 250 when the pluggable optical modules 240a-240n are plugged into the respective receptacles 235a-235n. The external optical connectors may transmit optical signals to, and/or receive optical signals from, one or more external optical devices.

In some examples, the plurality of receptacles 235a-235n are arranged at the faceplate 250 to define one or more air intake regions 255 in the faceplate 250. As shown in the diagram 200, the air intake region 255 is positioned between the receptacles 235b and 235c, although other positioning is also contemplated. In other examples, the faceplate 250 need not define an air intake region 255 as large as shown in the diagram 200. In some examples, the faceplate 250 may include one or more additional external optical connectors arranged between the receptacles 240b and 240c (or elsewhere along the faceplate 250). In one example configuration, the pluggable optical modules 240a-240n may be configured as pluggable optical device with external laser source (ELS) module units that provide optical energy to the photonic dies 220a-220d via the optical fibers 245. Based on signals received from the host PCB 205, the ASIC 215, and/or the electronic dies 225, the photonic dies 220a-220d provide optical signals (e.g., modulated signals) to the external optical connectors via the pluggable devices. The interface of each photonic device and pluggable device pair (e.g., pluggable optical device 240a and photonic device 220a) is determined by the interface of the pluggable device such that any interface device may be plugged into any of the receptacles 235a-235n.

FIG. 3 illustrates coupling a pluggable optical module with a network device, according to one or more embodiments. The features illustrated in diagram 300 may be used in conjunction with other embodiments, e.g., using the network device 100 of FIG. 1 and network device 202 of FIGS. 2A and 2B.

In the diagram 300, a pluggable optical module 240 is inserted into an opening 120 of the network device (also referred to 24 as a "host device"). The openings 120a-120n of FIG. 1 may be considered instances of the opening 120 shown in FIG. 1. The pluggable optical module 240 includes a housing, a PCB 315 within the housing, one or more optical connectors 320 attached to the PCB 315 along a first end of the PCB 315 (e.g., a lead edge of the PCB 315 as inserted into the opening 120), and one or more electrical contacts 325 attached to the PCB 315 near the first end. In some examples, the network device provides electrical power and/or signals to the pluggable optical module 240 using the one or more electrical contacts 325.

The housing may have any suitable dimensioning for being received into the opening 120. Although not shown, the network device may include a cage or other structure that is dimensioned to receive the pluggable optical module 240 therein. In some examples, the housing is contoured to slide into and out of the network device through the opening 120. The housing may have a standardized dimensioning (e.g., to comply with QSFP-DD), or may have a proprietary dimensioning.

The optical connectors 320 and the one or more electrical contacts 325 may have any suitable dimensioning. Some non-limiting examples of the optical connector(s) 320 include Mechanical Transfer (MT), Multiple-Fiber Push-On/Pull-Off (MPO, MTP), SN, and so forth. In some examples, each of the optical connector(s) 320 includes one or more ferrules that couple with optical fibers 245 (e.g., the optical fibers 245a-245d). In some examples, the one or more electrical contacts 325 include an edge connector having one or more conductive traces.

In some examples, the optical connectors 320 are attached to a top side of the PCB 315, and the one or more electrical contacts 325 are attached to a bottom side of the PCB 315. In some examples, the one or more electrical contacts 325 couple with electrical contacts 345 on the host device side, which in some cases may be elastically biased.

The host device includes a host PCB 340, one or more connectors 330 attached to the host PCB 340, and one or more optical fibers 245 coupled with the connector 330. In some examples, each of the one or more connectors 330 is formed of a single component. In other examples, each of the one or more connectors 330 may be a connector assembly formed of multiple components. The one or more connectors 330 are configured to receive internal optical connectors such as the one or more optical connectors 320, which aligns one or more optical components of the pluggable optical module 240 into a coupled configuration with the one or more optical fibers 245. In some examples, the one or more connectors 330 retain the one or more optical connectors 320 in the coupled configuration.

In the coupled configuration, the electrical contacts 345 are coupled with the one or more electrical contacts 325. In some examples, the compliance of the electrical contacts 345 (when elastically biased) accommodates the alignment of the one or more connectors 330 with the one or more optical connectors 320. As shown, the electrical contacts 345 are attached to the host PCB 340. In alternate implementations, the electrical contacts 345 are attached to the one or more connectors 330. The connector 330 may include electrical contacts on a bottom side of the connector 330 that couple with corresponding electrical contacts on a top side of the host PCB 340 when the connector 330 is attached to the host PCB 340.

FIG. 4 illustrates coupling two pluggable optical modules in a stacked configuration with a network device, according to one or more embodiments. The features illustrated in diagram 400 may be used in conjunction with other embodiments, e.g., using the network device 100 of FIG. 1 and the network device 202 of FIGS. 2A and 2B.

In the diagram 400, a first pluggable optical module 240d is inserted into an upper opening 120a of the pair 115a, and a second pluggable optical module 240n is inserted into a lower opening 120b. The network device includes a cage 405 that is attached to the host PCB 340, and that defines the upper opening 120a and the lower opening 120b.

One or more additional components of the host device may be attached to the cage 405. In some examples, a connector assembly 410 is attached to the cage 405, and includes a first connector 330a aligned with the upper opening 120a, and a second connector 330b aligned with the lower opening 120b. Each of the connectors 330a and 330b represents one example of the connector 330 of FIG. 3, and in some cases may be similarly configured to each other. The connectors 330a and 330b may be connected into the connector assembly 410 using any suitable techniques. In alternate examples, the first connector 330a and the second connector 330b are separate from each other.

A heat sink 415 is attached to a top of the cage 405 and extends partly into the interior volume of the cage 405. The heat sink 415 thermally couples with the first pluggable optical module 240d, e.g., by contacting the top of the cage of the first pluggable optical module 240d when the first pluggable optical module 240d is inserted into the upper opening 120a. A heat sink 420 is attached to the cage 405 and extends partly into the interior volume of the cage 405. The heat sink 420 thermally couples with the second pluggable optical module 240n, e.g., by contacting the top of the cage of the second pluggable optical module 240n when the second pluggable optical module 240n is inserted into the lower opening 120b. In some examples, the heat sink 415 is configured as a top heat sink, and the heat sink 420 is configured as an integrated riding heat sink. The heat sinks 415 and 420 provide cooling to the pluggable optical modules 240d and 240n, including cooling to the various optical components and ELS modules located on the modules and described in more detail in relation to FIGS. 5 and 6.

FIG. 5 provides a top view of a photonic device connected to a pluggable optical module, according to an embodiment. Optical system 500 includes photonic device 220 connected to one of either a pluggable optical device 540a or pluggable optical device 540b via a shared FAU 230 and optical fibers 245. In some examples, an interface of the photonic device 220 is determined by the type of device connected. For example, the device 540a is a Datacenter Reach (DR4) device with a DR laser source subassembly such as DR4 ELS 550a and the pluggable optical device 540b is a Fiber Reach (FR4) device with a FR laser source subassembly such as FR4 ELS 550b. In some examples, the FR4 ELS 550b includes 2 coarse wavelength division multiplexing (CWDM) laser sources generating laser source signals. While previous CPO optical engine or photonic devices would have different interfaces to accommodate the different types of devices, the photonic device 220 may connect to either of the pluggable optical devices 540a and 540b, where the device connected determines the optical interface.

The pluggable optical devices 540a and 540b each include the respective laser sources such as the DR4 ELS 550a and FR4 ELS 550b. The laser sources receive electrical power provided by the host device generate and deliver optical energy to the photonic device 220 via fibers 245 and shared FAU 230. As shown, the DR4 ELS 550a generates laser signals 552a which are coupled to the fibers via optical fibers on the device 540a and an optical connector connecting to the optical fibers 245 (e.g., the optical connector 320). The FR4 ELS 550b generates laser signals 552b which are coupled to the optical fibers 245 via optical fibers on the pluggable optical device 540b and an optical connector connecting to the optical fibers 245 (e.g., the optical connector 320).

The photonic device 220 includes a set of laser source input channels 555 connected via a shared FAU to an ELS located on one of the pluggable optical devices 540a or 540b. For example, when the device 540a is connected, DR4 ELS 550a provides signals 552a via the optical fibers 245, the FAU 230 and the channels 555. In another example, when the pluggable optical device 540b is connected, an FR4 ELS 550b provides the signals 552b via the optical fibers 245 and the channels 555. The signals 552a or 552b are used to control the modulators 520 which in turn modulate optical signals at the photonic device 220 for output/transmission via a set of optical output channels 525.

For example, when the device 540a is connected, the modulators 520 generate and transmit the signals via channels 525 for a DR4 network such that the signals in the channels 525 travel via the optical fibers 245 to the device 540a, where the signals traverse the pluggable optical device 540a as the signals 562a on fibers 560a and exit the pluggable optical device 540a as the signals 564a. In some examples, the fibers 560a include 32 SMF fibers between an internal and external connector on the pluggable optical device 540a.

In another example, when the pluggable optical device 540b is connected, the modulators 520 generate and transmit the signals via channels 525 for a FR4 network such that the signals travel via the optical fibers 245 to the pluggable optical device 540b, where the signals traverse the pluggable optical device 540a as the signals 562b on fibers 560b and exit the pluggable optical device 540a as the signals 564b. In some examples, the fibers 560b include 32 SMF fibers between an internal and external connector on the pluggable optical device 540a and include an optical conditions components 575a, such as a fanout device, etc., which prepare/transform the optical signals 562b for an external network.

Additionally, the photonic device 220 includes photodetectors 530 which are connected to a set of optical input channels receiving input optical signals from either the pluggable optical device 540a or 540b via the shared FAU 230 and optical channels 535.

For example, when the device 540a is connected, the photodetectors 530 receive the signals via channels 535 from a DR4 network. For example, signals 568a are received from an external network and traverse the pluggable optical device 540a on fibers 560a and exit the pluggable optical device 540a as the signals 566a and the channels 535. In some examples, the fibers 565a include 32 SMF fibers between an internal and external connector on the pluggable optical device 540a.

For example, when the pluggable optical device 540b is connected, the photodetectors 530 receive the channels 535 from a FR4 network. For example, signals 568b are received from an external network and traverse the pluggable optical device 540b on fibers 560b and exit the pluggable optical device 540b as the signals 566b via the channels 535. In some examples, the fibers 565b include 32 SMF fibers between an internal and external connector on the pluggable optical device 540b and include an optical conditions components 575b, such as a fanout device, etc., which prepare/transform the optical signals 568b for the internal network (e.g., the optical fibers 245). While the examples shown in FIG. 5 include 32 SMF fibers, additional space may be saved utilizing MCF as shown in FIG. 6.

FIG. 6 provides a top view of a photonic device connected to a pluggable optical module, according to an embodiment. Optical system 600 includes photonic device 220 connected to one of either a pluggable optical device 640a or pluggable optical device 640b via a shared FAU 230 and optical fibers 245 where the optical fibers include 8 PMF. In some examples, an interface of the photonic device 220 is determined by the type of device connected. For example, the pluggable optical device 640a is a DR4 device with a DR4 ELS 650a and the pluggable optical device 640b is a FR4 device with a FR4 ELS 650b. While previous CPO optical engine or photonic devices would have different interfaces to accommodate the different types of devices, the photonic device 220 may connect to either of the pluggable optical device 640a and 640b, where the device connected determines the optical interface.

The pluggable optical devices 640a and 640b each include the respective laser sources such as the DR4 ELS 650a and FR4 ELS 650b. The laser sources receive electrical power provided by the host device generate and deliver optical energy to the photonic device 220 via fibers 245 and shared FAU 230. As shown, the DR4 ELS 650a generates laser source signals 652a which are coupled to the fibers via optical fibers on the pluggable optical device 640a and an optical connector connecting to the optical fibers 245 (e.g., the optical connector 320). The FR4 ELS 650b generates laser source signals 652b which are coupled to the optical fibers 245 via optical fibers on the pluggable optical device 640b and an optical connector connecting to the optical fibers 245 (e.g., the optical connector 320).

The photonic device 220 includes a set of laser source input channels 655 connected via a shared FAU to an ELS located on one of the pluggable optical devices 640a or 640b. For example, when the pluggable optical device 640a is connected, DR4 ELS 650a provides signals 652a via the optical fibers 245, the FAU 230 and the channels 655. In another example, when the pluggable optical device 640b is connected, the FR4 ELS 650b provides the signals 652b via the optical fibers 245 and the channels 655. The signals 652a or 652b are used to control the modulators 620 which in turn modulate optical signals at the photonic device 220 for output/transmission via a set of optical output channels 625, which may include 8 4 core MCF.

For example, when the pluggable optical device 640a is connected, the modulators 620 generate and transmit the signals via the channels 625 for a DR4 network such that the signals travel via the optical fibers 245 to the pluggable optical device 640a, where the signals traverse the pluggable optical device 640a as the signals 662a on fibers 660a and exit the pluggable optical device 640a as the signals 664a. In some examples, the fibers 660a include 8 4 core MCF between an internal connector and conditioning components 680 (e.g., a fanout device, etc.) and a subset of 32 SMFs between conditioning components 680 (e.g., a fanout device, etc.) and an external connector on the pluggable optical device 640a.

In another example, when the pluggable optical device 640b is connected, the modulators 620 generate and transmit the signals for a FR4 network such that the signals travel via the optical fibers 245 to the pluggable optical device 640b, where the signals traverse the pluggable optical device 640b as the signals 662b on fibers 660b and exit the pluggable optical device 640b as the signals 664b. In some examples, the fibers 660b include 32 SMF fibers between an internal and external connector on the pluggable optical device 640a and include an optical conditions components 675a, such as a fanout device, which prepare/transform the optical signals 662b for an external network.

Additionally, the photonic device 220 includes photodetectors 630 which are connected to a set of optical input channels receiving input optical signals from either the pluggable optical device 640a or 640b via the shared FAU 230 and optical channels 635 which may include 8 4 core MCF.

For example, when the pluggable optical device 640a is connected, the photodetectors 630 receive the signals via channels 635 from a DR4 network. For example, signals 668a are received from an external network and traverse the pluggable optical device 640a on fibers 665a and exit the pluggable optical device 640a as the signals 667a. In some examples, the fibers 665a include 8 4 core MCF between an internal connector and conditioning components 685 (e.g., a fanout devices, etc.) and a subset of 32 SMFs between conditioning components 685 (e.g., a fanout device, etc.) and an external connector.

In another example, when the pluggable optical device 640b is connected, the photodetectors 630 receive the signals via channels 635 from a FR4 network. For example, signals 668b are received from an external network and traverse the pluggable optical device 640a on fibers 665b and exit the pluggable optical device 640b as the signals 667b onto the channels 635. In some examples, the fibers 665b include 32 SMF fibers between an external connector on the pluggable optical device 640b and optical conditions components 675b, such as a fanout device, which prepare/transform the optical signals 668b for the internal network (e.g., the optical fibers 245), where 4 8 core MCF are connected between the components 675b and the internal connector.

Figures 7A, 7B:
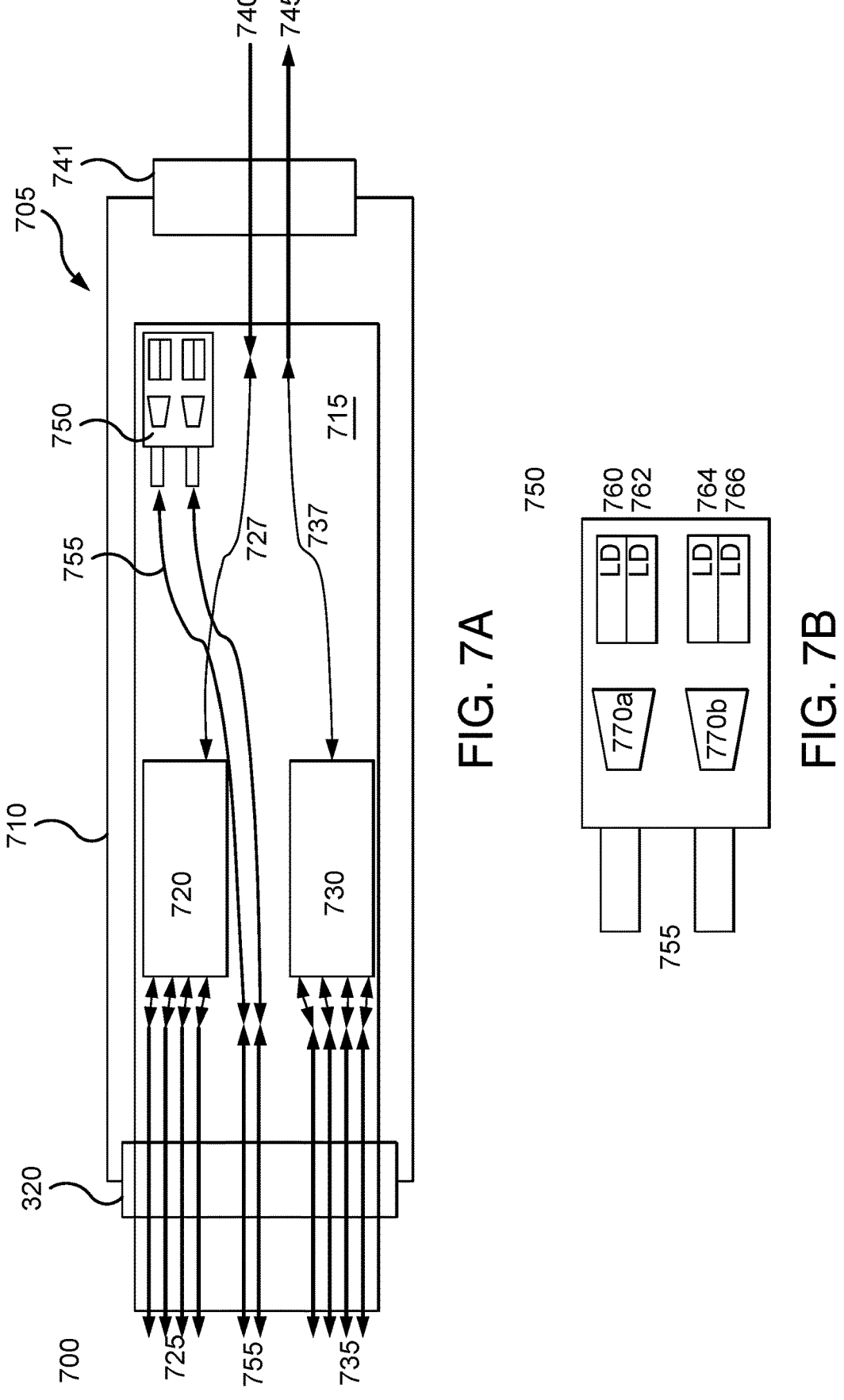
FIGS. 7A and 7B provides views of a pluggable optical module configured as a hybrid laser module and optical conditioning unit, according to one or more embodiments.

FIGS. 7A and 7B provides a view of a pluggable optical module 705 configured as a hybrid ELS and optical conditioning unit, according to one or more embodiments. More specifically, the diagram 700 in FIG. 7A provides a top view of the pluggable optical module 705. The features illustrated in the diagram 700 may be used in conjunction with other embodiments, including any of the pluggable optical modules shown in FIGS. 2A-6. For example, the pluggable optical module 705 represents one possible implementation of the pluggable optical module 240 of FIG. 2 and may be inserted into, e.g., the host devices illustrated in FIGS. 1-4.

In the diagram 700, the pluggable optical module 705 includes a housing 710, and a PCB 715 arranged in the housing 710 and attached to the housing 710. The pluggable optical module 705 further comprises an optical connector 320 attached to a top side of the PCB 715 along a first end of the PCB 715, and a plurality of electrical contacts arranged at a bottom side of the PCB 715 near the first end (not shown in FIG. 7A).

The pluggable optical module 705 also includes ELS module 750 that receives electrical power provided by the host device via one or more of the electrical contacts. As shown, the ELS module 750 includes include multiple laser source paths, such as channels 755 coupled to the optical connector 320 via multiple optical fibers (e.g., PMF). For example, as shown in FIG. 7B, the ELS module 750 may include multiple laser diodes 760, 762, 764, and 766 and conditioning components 770a and 770b.

The pluggable optical module 705 also includes an external optical connector 741 arranged near a second end of the PCB 715. Additionally, optical channels 727 and optical channels 737 extend between the optical connector 320 and the optical connector 741 to send and receive external optical signals 740 and 745. The optical channels 727 may include SMF, MCF, PMF, or other optical fibers to carry the optical signals. The optical channels may also include optical conditioning components 720 and 730 which provide any appropriate optical condition to the signals in the module 705 in order to prepare the signals for transmission via the external connector 741 or the optical connector 320 (e.g., signals 725 and signals 735). For example, the optical condition components may include any combination of an optical amplifier, an optical attenuator, an optical filter, an optical dispersion controller, an optical multiplexer, an optical demultiplexer, an optical switch, and an optical repeater.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A photonic device comprising:
   a set of laser source input channels connected via a shared connector of a fiber array unit (FAU) to an External Laser Source (ELS) located on a pluggable optical device;
   a set of optical input channels receiving input optical signals from the pluggable optical device via the shared connector of the FAU, wherein the pluggable optical device is configured to receive the input optical signals from an external network; and
   a set of optical output channels transmitting optical signals from the photonic device to the ELS via the shared connector of the FAU.

2. The photonic device of claim 1, wherein the set of laser source input channels comprises polarization maintaining fibers (PMFs) connecting the FAU to the pluggable optical device.

3. The photonic device of claim 1, wherein the set of optical input channels comprises a first plurality of single mode optical fibers connecting the FAU to the pluggable optical device, and wherein the set of optical output channels comprises a second plurality of single mode optical fibers connecting the FAU to the pluggable optical device.

4. The photonic device of claim 3, wherein the ELS comprises
   a datacenter reach (DR) laser source subassembly generating laser source signals;
   an internal optical connector connected to the FAU;
   an external optical connector;
   a plurality of laser source paths connecting the DR laser source subassembly to the internal optical connector; and
   a plurality of optical channels connecting the internal optical connector to the external optical connector.

5. The photonic device of claim 3, wherein the ELS comprises
   a fiber reach (FR) laser source subassembly generating laser source signals;
   an internal optical connector connected to the FAU;
   an external optical connector;
   a plurality of laser source paths connecting the FR laser source subassembly to the internal optical connector; and
   a plurality of optical channels connecting the internal optical connector to the external optical connector, where the plurality of optical channels comprises at least two fanout devices.

6. The photonic device of claim 1, wherein the set of optical input channels comprises 8 multicore optical fibers (MCFs) connecting the FAU to the ELS, and wherein the set of optical output channels comprises 8 MCFs connecting the FAU to the ELS.

7. The photonic device of claim 6, wherein the ELS comprises
   a datacenter reach (DR) laser source subassembly generating laser source signals;
   an internal optical connector connected to the FAU;
   an external optical connector;
   a plurality of laser source paths connecting the DR laser source subassembly to the internal optical connector; and a plurality of optical channels connecting the internal optical connector to the external optical connector, wherein the plurality of optical channels comprises a plurality of optical conditioning components.

8. The photonic device of claim 6, wherein the ELS comprises a fiber reach (FR) laser source subassembly generating laser source signals;

an internal optical connector connected to the FAU;

an external optical connector;

a plurality of laser source paths connecting the FR laser source subassembly to the internal optical connector; and a plurality of optical channels connecting the internal optical connector to the external optical connector, where the plurality of optical channels comprises at least two fanout devices.

9. An optical system comprising:

a pluggable optical device comprising:

a laser source subassembly;

an internal optical connector;

a plurality of laser source optical paths connecting the laser source subassembly to the internal optical connector;

an external optical connector;

a plurality of transmit optical paths connecting the internal optical connector and the external optical connector; and a plurality of receive paths connecting the internal optical connector and the external optical connector; and a photonic device comprising:

a set of laser source input channels connected to the pluggable optical device via a shared connector of a fiber array unit (FAU);

a set of optical input channels receiving input optical signals from the pluggable optical device via the shared connector of the FAU, wherein the pluggable optical device is configured to receive the input optical signals from an external network; and a set of optical output channels transmitting optical signals from the photonic device to the pluggable optical device via the shared connector of the FAU.

10. The optical system of claim 9, wherein the laser source subassembly comprises one of:

a datacenter reach (DR) laser source subassembly; and a fiber reach (FR) laser source subassembly.

11. The optical system of claim 9, wherein the FAU is connected to the internal optical connector via a set of polarization maintaining fibers (PMFs) and one of:

a set of single mode optical fibers (SMFs); and a set of multicore (MCFs).

* * * * *